United States Patent
Duan et al.

(10) Patent No.: US 10,616,791 B2
(45) Date of Patent: Apr. 7, 2020

(54) DATA TRANSMISSION METHOD, APPARATUS AND SYSTEM FOR SHUNTING TRANSMISSION OF LOCAL SERVICE

(71) Applicant: DATANG MOBILE COMMUNICATIONS EQUIPMENT CO., LTD., Beijing (CN)

(72) Inventors: Jianghai Duan, Beijing (CN); Guodong Ding, Beijing (CN); Xiaofeng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/083,181

(22) PCT Filed: Jan. 19, 2017

(86) PCT No.: PCT/CN2017/071761
§ 371 (c)(1),
(2) Date: Sep. 7, 2018

(87) PCT Pub. No.: WO2017/152722
PCT Pub. Date: Sep. 14, 2017

(65) Prior Publication Data
US 2019/0104434 A1 Apr. 4, 2019

(30) Foreign Application Priority Data
Mar. 7, 2016 (CN) .......................... 2016 1 0127917

(51) Int. Cl.
*H04W 28/02* (2009.01)
*H04W 28/10* (2009.01)
(Continued)

(52) U.S. Cl.
CPC ......... *H04W 28/0252* (2013.01); *H04L 63/02* (2013.01); *H04W 28/06* (2013.01);
(Continued)

(58) Field of Classification Search
CPC ..... H04W 76/27; H04W 88/16; H04W 68/02; H04W 92/045; H04W 28/06;
(Continued)

(56) References Cited

U.S. PATENT DOCUMENTS

2012/0046058 A1* 2/2012 Vesterinen ............ H04W 8/082
455/509
2012/0188895 A1* 7/2012 Punz ..................... H04W 76/12
370/252

(Continued)

FOREIGN PATENT DOCUMENTS

| CN | 101742686 A | 6/2010 |
|---|---|---|
| CN | 102422687 A | 4/2012 |

(Continued)

OTHER PUBLICATIONS

State IP Office of the P.R. China—International Search Report of the International Searching Authority, with an English translation of the International Search Report, dated Apr. 17, 2017 for International Application No. PCT/CN2017/071761 (5 pgs).

(Continued)

*Primary Examiner* — Ricardo H Castaneyra
(74) *Attorney, Agent, or Firm* — Womble Bond Dickinson (US) LLP

(57) ABSTRACT

Disclosed are a data transmission method, apparatus and system for realizing, when a UE is in a non-connected state, that shunting transmission of a local service can be completed, and that the use efficiency of a wireless resource can be improved. The data transmission method comprises: after a data packet sent by a local service server is received by an (Continued)

MEC server, when it is determined that a UE for receiving the data packet is in an RRC non-connected state, sending the data packet corresponding to the UE to a P-GW so as to trigger a paging process of the UE; and the MEC server querying, in a pre-set duration, downlink bearer information for transmitting the data packet to the UE, and when the downlink bearer information is found, sending the data packet according to the downlink bearer information.

9 Claims, 3 Drawing Sheets

(51) Int. Cl.

| | | |
|---|---|---|
| *H04W 68/00* | (2009.01) | |
| *H04W 76/27* | (2018.01) | |
| *H04L 29/06* | (2006.01) | |
| *H04W 28/06* | (2009.01) | |
| *H04W 68/02* | (2009.01) | |
| *H04W 88/16* | (2009.01) | |
| *H04W 92/04* | (2009.01) | |
| *H04W 76/10* | (2018.01) | |

(52) U.S. Cl.
CPC ........... *H04W 28/10* (2013.01); *H04W 68/00* (2013.01); *H04W 68/02* (2013.01); *H04W 76/27* (2018.02); *H04W 88/16* (2013.01); *H04W 92/045* (2013.01); *H04W 76/10* (2018.02)

(58) Field of Classification Search
CPC ............. H04W 28/0252; H04W 28/10; H04W 28/065; H04W 68/00; H04W 76/10; H04W 74/006; H04L 63/02
See application file for complete search history.

(56) References Cited

U.S. PATENT DOCUMENTS

| 2013/0148621 | A1 | 6/2013 | Laitila et al. |
| 2013/0294307 | A1 | 11/2013 | Johansson et al. |
| 2015/0195858 | A1* | 7/2015 | Jin ..................... H04L 41/5051 370/230 |

FOREIGN PATENT DOCUMENTS

| CN | 103430516 | A | 12/2013 |
| CN | 103748930 | A | 4/2014 |
| CN | 104137504 | A | 11/2014 |
| CN | 102474713 | A | 5/2015 |
| CN | 104602282 | A | 5/2015 |
| CN | 105246101 | A | 1/2016 |
| JP | 2013502121 | A | 1/2013 |
| JP | 2013509737 | A | 3/2013 |
| JP | 2014526163 | A | 10/2014 |
| WO | 2011023090 | A1 | 3/2011 |
| WO | 2013192108 | A2 | 12/2013 |
| WO | 2012032782 | A1 | 1/2014 |
| WO | 2014205779 | A1 | 12/2014 |
| WO | 2015064074 | A1 | 5/2015 |

OTHER PUBLICATIONS

State IP Office of the P.R. China—Written Opinion of the International Searching Authority with an English translation dated Apr. 17, 2017 for International Application No. PCT/CN2017/071761 (3 pgs).
Huawei, IBM, Intel, Nokia Networks, NTT DOCOMO, Vodafone: "Mobile-Edge Computing", Introductory Technical White Paper, Sep. 2014, 36 pages.
"5G Automotive Vision," 5G PPP, Oct. 20, 2015, 67 pages.
The First Chinese Office Action for Application No. 201610127917.7 dated Apr. 9, 2019, 10 pages (Machine Translation).
The Japanese Office Action for Application No. JP2018-547285 dated Aug. 1, 2019, 5 pages (Machine Translation).
"Mobile-Edge Computing," Introductory Technical White Paper, Sep. 2014, 36 pages, Issue 1.
The International Preliminary Report on Patentability for PCT Application No. PCT/SG2016/050217 dated Nov. 14, 2017, 11 pages.
The International Search Report for PCT Application No. PCT/SG2016/050217 dated Jul. 25, 2016, 8 pages.
The Written Opinion of the International Searching Authority for PCT Application No. PCT/SG2016/050217 dated Jul. 25, 2016, 10 pages.
Beck, et al., "ME-VoLTE: Network Functions for Energy-Efficient Video Transcoding at the Mobile Edge," 18th International Conference on Intelligence in Next Generation Networks, 2015, pp. 38-44, IEEE.
The Official Chinese Office Action for Application No. 201610127917.7 dated Nov. 7, 2019, 10 pages.

* cited by examiner

DATA TRANSMISSION METHOD, APPARATUS AND SYSTEM FOR SHUNTING TRANSMISSION OF LOCAL SERVICE

CROSS-REFERENCE TO RELATED APPLICATIONS

This patent application is a U.S. National Phase application under 35 U.S.C. § 371 of International Application No. PCT/CN2017/071761, filed on Jan. 19, 2017, entitled DATA TRANSMISSION METHOD, APPARATUS AND SYSTEM, which claims the benefit of priority from Chinese Patent Application No. 201610127917.7, filed with the Chinese Patent Office on Mar. 7, 2016, which was incorporated by reference in its entirety.

FIELD

The invention relates to the field of communication technologies, and particularly to a data transmission method, apparatus and system.

BACKGROUND

In the existing network architecture, the service platform is deployed behind the core network. With the proposing of the 5G network concept and the service requirement, the Mobile Edge Compute (MEC) technology emerges at the right moment. By the MEC technology, the service platform can be deployed close to the mobile edge.

According to the actual deployment location of the service platform, the service servers are divided into local service servers and remote service servers, wherein the local service servers are deployed at the access network side (e.g., base station side), the remote service servers are deployed at the core network side, and the remote service servers refer to the service servers which are not deployed locally. Due to the local deployment of the service servers, the MEC server can realize the shunting of the local service, so that the User Equipment (UE) can access the local service nearby without the transmission network and the core network, so the bandwidth consumption of the transmission network can be reduced, the service delay can be reduced and the user perception can be improved.

However, this existing local service shunting method is to obtain the bearer information corresponding to the UE based on the monitoring of the signalling and the traffic data of the S1 interface between the evolved-Node B (e-NB) and the Evolved Packet Core (EPC) by the MEC server, and then realize the transmission of the traffic data according to the bearer information. Its application premise is that the UE is in the Radio Resource Control (RRC) connected state, since only when the UE is in the RRC connected state, the e-NB has the context information of the UE, and the S1 interface between the e-NB and the EPC has the transmission of the signalling and the traffic data related to the UE. However, for the UE in the RRC idle state, the MEC server cannot establish the correspondence between the IP address of the UE and the bearer information of the UE through the above-mentioned monitoring process, so the MEC server can only discard the data when the local service server sends the data to the UE via the MEC server, so that the shunting of the local service cannot be completed.

In the prior art, in order to implement the shunting of the local service, the UE must be in the RRC connected state, while in order to make the UE be in the RRC connected state, the application layer of the UE and the application layer of the local service server are required to establish the heartbeat mechanism, and meanwhile the shorter heartbeat cycle is employed. Furthermore, in order to avoid releasing the UE by the e-NB in the survival detection way to cause the UE to enter the RRC idle state, there is a need to turn off the UE survival detection switch of the e-NB or properly extend the setting of the UE survival detection cycle.

Based on the above analysis, there are the following drawbacks in the prior art:

(1) in the most scenarios, the UE needs to install the related application (APP) so that the UE and the local service server ensure that they are always in the RRC connected state by the heartbeat mechanism, which will limit the popularization and application of the prior art greatly;

(2) the heartbeat mechanism also makes the power consumption problem of the UE more prominent, which causes the poorer user experience;

(3) once the UE is in the RRC idle state, it cannot complete the called process and thus cannot realize the shunting transmission of the local service;

(4) due to the usage limitation of the UE survival detection method, the usage effectiveness of the radio resources of the e-NB may also reduce therewith.

BRIEF SUMMARY

The embodiments of the invention provides a data transmission method, apparatus and system, so as to implement the shunting transmission of the local service when the UE is in the idle state and increase the usage effectiveness of the radio resources.

A data transmission method provided by an embodiment of the invention includes:

after receiving a data message sent by a local service server and when determining that a UE for receiving the data message is in an RRC non-connected state, sending, by an MEC server, the data message corresponding to the UE to a Packet Data Network-GateWay (P-GW) to trigger a paging process of the UE;

inquiring, by the MEC server, downlink bearer information for transmitting the data message to the UE in a preset duration, and sending the data message according to the downlink bearer information when inquiring the downlink bearer information.

In this method, after receiving the data message sent by the local service server and when determining that the UE for receiving the data message is in the RRC non-connected state, the MEC server sends the data message corresponding to the UE to the P-GW to trigger the paging process of the UE, to make the UE enter the RRC connected state by the paging process, so that the MEC server can inquire the downlink bearer information in the preset duration and send the data message according to the downlink bearer information to complete the shunting transmission of the local service. With this method, the limitation that the UE must be in the RRC connected state in the prior art is eliminated, that is, when the UE is in the RRC idle state, the shunting transmission of the local service can be completed by this method. Thus the UE can not need the mandatory installing of the related APPs and not need to establish the heartbeat mechanism along with the local service server, to ensure that the UE is in the connected state, solve the power consumption problem of the UE effectively and improve the user experience; and at the same time, the base station does not need to limit the survival detection of the UE either, to thereby increase the usage effectiveness of the radio resources.

Optionally, determining, by the MEC server, that the UE for receiving the data message is in the RRC non-connected state after receiving the data message sent by the local service server, includes:

after receiving the data message sent by the local service server, inquiring, by the MEC server, whether the downlink bearer information for transmitting the data message to the UE exists, and determining, by the MEC server, that the UE is in the RRC non-connected state when determining that there is no the downlink bearer information from inquiry.

Optionally, sending, by the MEC server, the data message corresponding to the UE to the P-GW, includes:

sending, by the MEC server, the data message corresponding to the UE to a Fire Wall (FW), and forwarding, by the FW, the data message to the P-GW.

Thus the security of data transmission is increased.

Optionally, inquiring, by the MEC server, whether the downlink bearer information for transmitting the data message to the UE exists in the preset duration, includes:

monitoring, by the MEC server, whether signalling and traffic data related to the UE exist at an S1 interface between an e-NB and an EPC in the preset duration;

determining that there is the downlink bearer information for transmitting the data message to the UE from inquiry when monitoring from the S1 interface that a correspondence between an IP address and bearer of the UE is contained in the signalling and traffic data related to the UE.

Another data transmission method provided by an embodiment of the invention includes:

receiving, by a P-GW, a data message sent by an MEC server; wherein the data message sent by the MEC server is sent to the P-GW when the MEC server determines that a User Equipment, UE, for receiving the data message is in an RRC non-connected state;

sending, by the P-GW, the data message to a Serving Gateway (S-GW), and triggering, by the S-GW, a paging process of the UE.

Optionally, the P-GW receives the data message forwarded by a Fire Wall, FW, and the data message is sent by the MEC server.

A data transmission apparatus provided by an embodiment of the invention includes:

a first module configured to, after receiving a data message sent by a local service server and when determining that a User Equipment, UE, for receiving the data message is in a Radio Resource Control, RRC, non-connected state, send the data message corresponding to the UE to a Packet Data Network-GateWay, P-GW, to trigger a paging process of the UE;

a second module configured to inquire downlink bearer information for transmitting the data message to the UE in a preset duration, and send the data message according to the downlink bearer information when there is the downlink bearer information from inquiry.

Optionally, the first module is configured to determine that the UE for receiving the data message is in the RRC non-connected state after receiving the data message sent by the local service server by:

after receiving the data message sent by the local service server, inquiring whether the downlink bearer information for transmitting the data message to the UE exists, and determining that the UE is in the RRC non-connected state when determining that there is no the downlink bearer information from inquiry.

Optionally, the first module is configured to send the data message corresponding to the UE to the P-GW by:

sending the data message corresponding to the UE to a Fire Wall, FW, which forwards the data message to the P-GW.

Optionally, the second module is configured to inquire whether the downlink bearer information for transmitting the data message to the UE exists in the preset duration by:

monitoring whether signalling and traffic data related to the UE exist at an S1 interface between an evolved-Node B, e-NB, and an EPC in the preset duration;

determining that there is the downlink bearer information for transmitting the data message to the UE from inquiry when monitoring from the S1 interface that a correspondence between an IP address and bearer of the UE is contained in the signalling and traffic data related to the UE.

Another data transmission apparatus provided by an embodiment of the invention includes:

a receiving module configured to receive a data message sent by a Mobile Edge Compute, MEC, server; wherein the data message sent by the MEC server is sent to the apparatus when the MEC server determines that a User Equipment, UE, for receiving the data message is in a Radio Resource Control, RRC, non-connected state;

a sending module configured to send the data message to a Serving Gateway, S-GW, which triggers a paging process of the UE.

Optionally, the receiving module receives the data message forwarded by a Fire Wall, FW, and the data message is sent by the MEC server.

A data transmission system provided by an embodiment of the invention includes the both of data transmission apparatuses described above.

DETAILED DESCRIPTION OF THE EMBODIMENTS

The embodiments of the invention provides a data transmission method, apparatus and system, so as to implement the shunting transmission of the local service when the UE is in the idle state and increase the usage effectiveness of the radio resources.

In order to make the objects, technical solutions and advantages clearer, the invention will further be illustrated below in details with reference to the drawings and the embodiments. It should be understood that the specific embodiments described herein are only used to explain the invention but not to limit the invention.

Figure 1:
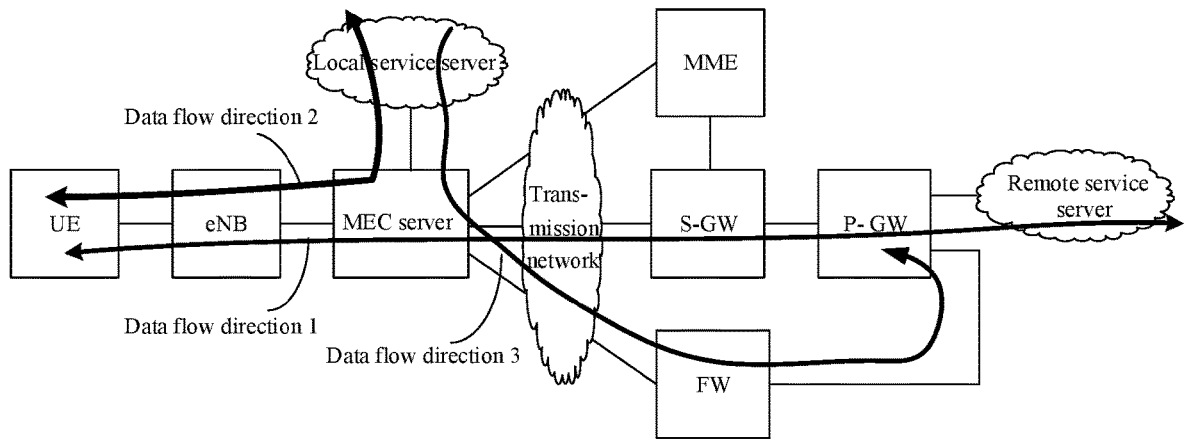
FIG. 1 is a schematic diagram of a network architecture and the traffic data flow direction provided by an embodiment of the invention.

FIG. 1 is a schematic diagram of a network architecture and the traffic data flow direction provided by an embodiment of the invention.

Here, the MEC server, the e-NB and the local service server are all deployed in the same network level, i.e., close to the mobile edge, and the MEC server is connected to the e-NB and the local service server respectively; the Mobility Management Entity (MME), S-GW and P-GW are included at the EPC side, and the remote service server behind the EPC is deployed in the higher network level (such as core machine room). In this network architecture, the MEC server is not only connected in series at the S1 interface between the e-NB and EPC and connected by the transmission network (such as PTN network), but also connected to the Fire Wall (FW) and the P-GW by the transmission network.

It is necessary to note that, in this network architecture, there can also be no FW, that is to say, it is also possible for the MEC server to be connected to the P-GW directly by the transmission network.

Furthermore, in this network architecture provided by the embodiment of the invention, the S-GW and the P-GW are arranged at the EPC side respectively. Of course, the S-GW and the P-GW can also be arranged together, i.e., arranged in the same entity device. When the S-GW and the P-GW are arranged together, they can also collectively referred to as the System Architecture Evolution Gateway (SAE-GW).

Under this network architecture, for the remote service, its data flow direction refers to the data flow direction 1 in FIG. 1. That is, UE <--> e-NB <--> MEC server <--> S-GW <--> P-GW <--> remote service server. That is, the traffic data message of the user plane can start from the UE, be transmitted via the e-NB, MEC server, S-GW and P-GW respectively, and be finally sent to the remote service server; the traffic data message of the user plane can also start from the remote service server, be transmitted via P-GW, S-GW, MEC server and e-NB respectively, and be finally sent to the UE.

For the local service, its data flow direction refers to the data flow directions 2 and 3 in FIG. 1. Specifically, the uplink data flow direction is UE --> e-NB --> MEC server --> local service server; the downlink data flow direction can be divided into two ways, one of which is local service server --> MEC server --> e-NB --> UE and the other is local service server --> MEC server --> FW --> P-GW. Here, for the downlink data flow direction: local service server --> MEC server --> FW --> P-GW, when there is no FW in the network architecture, this downlink data flow direction can be represented as: local service server --> MEC server --> P-GW.

The data flow directions of the local service described above will be illustrated below in details.

(1) For the uplink data transmission.

When the MEC server receives the uplink traffic data message which is sent by the UE and of which the destination IP address is the IP address of the local service server, the UE must be in the RRC connected state, and then the MEC server can obtain the correspondence between the IP address and the bearer of the UE (or called the tunnel information of the UE) by monitoring the signalling and traffic data related to the UE at the S1 interface between the e-NB and the EPC, and then send the data message to the local service server by the bearer corresponding to the UE.

(2) For the downlink data transmission.

Figure 2A:
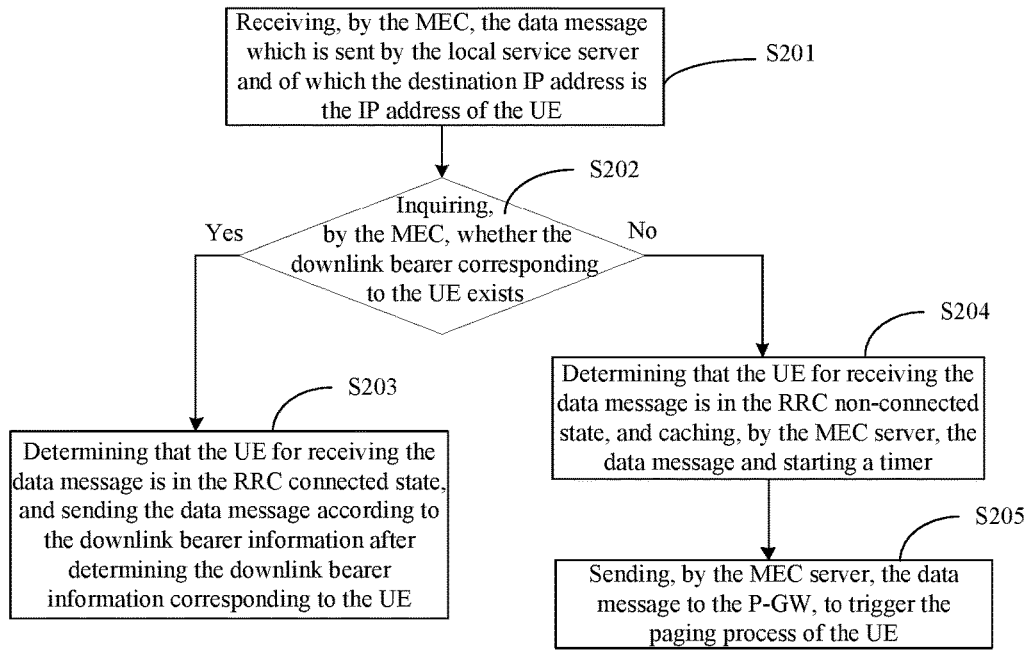
FIG. 2A is a flow schematic diagram of a data transmission method of the downlink local service provided by an embodiment of the invention.

Referring to FIG. 2A, the specific process is as follows.

S201: receiving, by the MEC server, the downlink traffic data message which is sent by the local service server and of which the destination IP address is the IP address of the UE.

S202: inquiring, by the MEC server, whether the downlink bearer information for transmitting the data message to the UE exists, and turning to the step S203 when there is the downlink bearer information from inquiry, otherwise turning to the step S204.

S203: determining that the UE for receiving the data message is in the RRC connected state, and sending the data message according to the downlink bearer information after determining the downlink bearer information corresponding to the UE.

S204: determining that the UE for receiving the data message is in the RRC non-connected state, and caching, by the MEC server, the data message (i.e., local service data message corresponding to the UE) and starting a timer.

Here, in this step, when the downlink bearer information for transmitting the data message to the UE is not inquired, the MEC server determines that the UE for receiving the data message is in the RRC non-connected state, which can include the following conditions: the UE is in the RRC idle state, or the UE is in the shutdown state, or the UE is not in the service range of the MEC server at that time. The UE may in the RRC idle state when the MEC server does not inquire the downlink bearer information for transmitting the data message to the UE, so the step S205 continues to be performed to trigger the paging process of the UE, so that the UE is in the RRC connected state again.

S205: sending, by the MEC server, the data message to the P-GW, to trigger the paging process of the UE.

Here, optionally, the MEC server can send the first N data messages to the P-GW, where N can be set voluntarily, that is, the MEC server only sends a part of the data messages sent by the local service server to the P-GW.

Figure 2B:
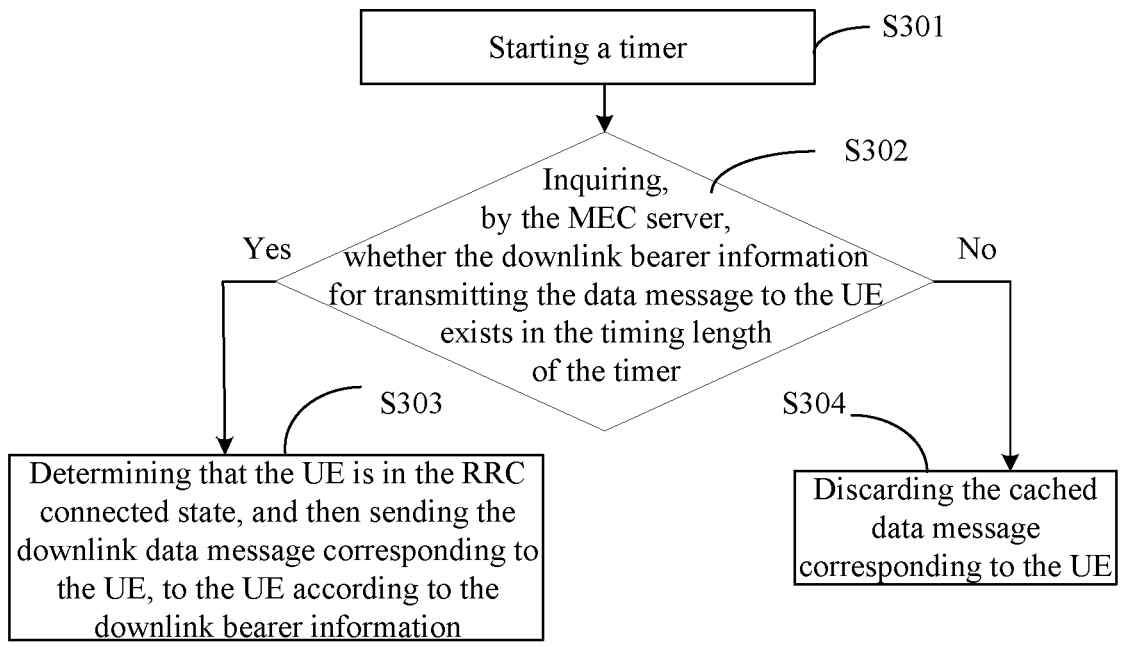
FIG. 2B is a flow schematic diagram of the traffic data process of an MEC server provided by an embodiment of the invention.

Here, after the MEC server starts the timer, the processing procedure of the data message corresponding to the UE is as shown in FIG. 2B, and the specific process thereof is as follows.

S301: starting, by the MEC server, a timer when determining that the UE for receiving the data message is in the RRC non-connected state.

S302: inquiring, by the MEC server, whether the downlink bearer information for transmitting the data message to the UE exists in the timing length of the timer; turning to the step S303 if there is downlink bearer information from inquiry; turning to the step S304 if there is no downlink bearer information from inquiry after the timer expires.

S303: determining that the UE is in the RRC connected state, and then sending the downlink data message corresponding to the UE to the UE according to the downlink bearer information.

S304: discarding the cached data message corresponding to the UE.

Here, in the timing length of the timer, the MEC server determines that the UE has already been in the RRC connected state, and then the downlink data messages corresponding to the UE sent to the UE according to the downlink bearer information include the local service data messages corresponding to the UE and cached by the MEC server previously, and may also include, for example, the remote service data messages forwarded by the P-GW and sent by the remote server. Therefore the MEC server needs to process the service data messages required to be sent to the UE. As a processing method, for example, the MEC server cannot discard the first N data messages which have been sent to the P-GW in the cached data messages, but discard the data messages which are sent by the P-GW and of which the source IP address is the IP address of the local service server. Thus the problem of repeatedly sending the said first N data messages can be avoided and it is ensured that the data messages can arrive at the UE sequentially.

Here, if the MEC server inquires that the downlink bearer information corresponding to the UE exists in the timing length of the timer, there can be two following situations.

First situation: in the timing length of the timer, the P-GW triggers the paging process of the UE according to the received data message corresponding to the UE, and the UE enters the RRC connected state successfully in the called way.

Second situation: in the timing length of the timer, the UE enters the RRC connected state in the calling way.

In a word, in the timing length of the timer, no matter whether the UE enters the RRC connected state successfully through the first situation or the second situation, the MEC server can obtain the correspondence between the IP address and the bearer of the UE by way of monitoring the signalling and traffic data at the S1 interface, and then send the downlink data message corresponding to the UE to the UE through the bearer.

The event that the P-GW triggers the paging process of the UE according to the received data message corresponding to the UE and sent by the MEC server in the timing length of the timer set by the MEC server will be introduced below in brief, and the specific process is as follows.

When determining that the UE for receiving the data message is in the RRC non-connected state, the MEC server starts a timer and sends the data message to the P-GW; and after receiving the data message, the P-GW sends the data message to the S-GW according to the prior art, and the S-GW triggers the paging process of the UE. At that time, if the UE is in the RRC non-connected state and in the paging range, the UE responds to the paging and enters the RRC connected state by the paging process, i.e., the called process. Thus, the timing length of the above timer started by the MEC server can be set by reference to the total time length of the paging of the network side and the response of the UE to the paging.

Figure 3:
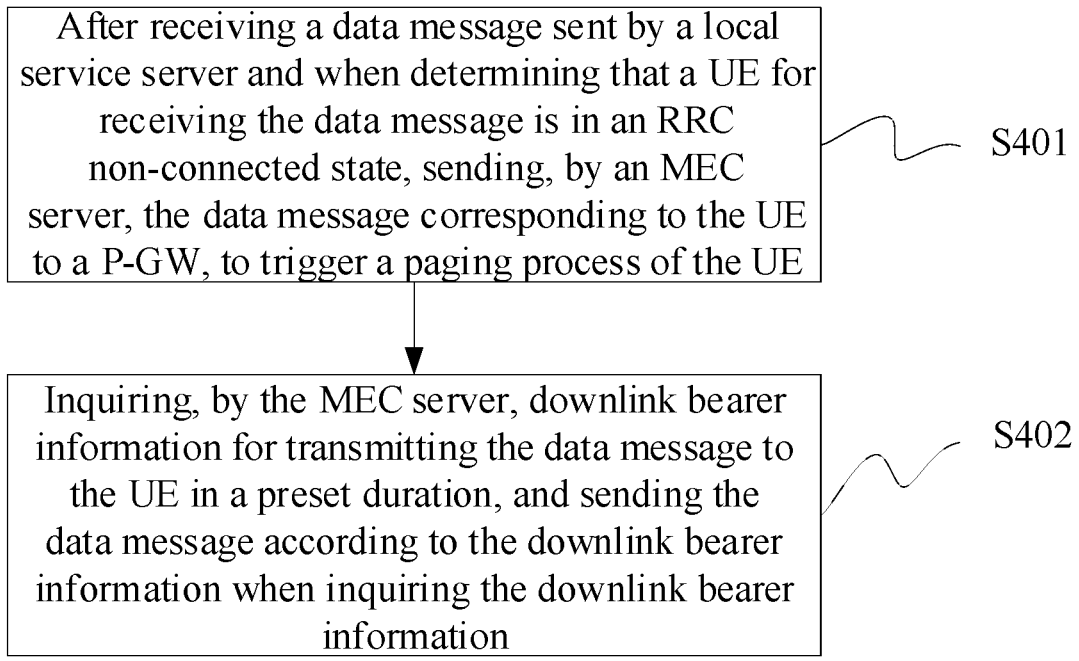
FIG. 3 is a flow schematic diagram of a data transmission method provided by an embodiment of the invention.

In conclusion, at the MEC server side, referring to FIG. 3, a data transmission method provided by an embodiment of the invention includes followings.

S401: after receiving a data message sent by a local service server and when determining that a UE for receiving the data message is in an RRC non-connected state, sending, by an MEC server, the data message corresponding to the UE to a P-GW, to trigger a paging process of the UE.

S402: inquiring, by the MEC server, downlink bearer information for transmitting the data message to the UE in a preset duration, and sending the data message according to the downlink bearer information when there is the downlink bearer information from inquiry.

Here, the preset duration has the same meaning as the timer started by the MEC server as mentioned above, that is, the preset duration corresponds to the timing length of the timer.

Optionally, sending, by the MEC server, the data message corresponding to the UE to the P-GW, specifically includes followings.

Sending, by the MEC server, the data message corresponding to the UE to a Fire Wall, FW, and forwarding, by the FW, the data message to the P-GW.

Optionally, inquiring, by the MEC server, whether the downlink bearer information for transmitting the data message to the UE exists in the preset duration, specifically includes followings.

Monitoring, by the MEC server, whether signalling and traffic data related to the UE exist at an S1 interface between an evolved-Node B, e-NB, and an Evolved Packet Core, EPC, in the preset duration.

Determining that the downlink bearer information for transmitting the data message to the UE has been inquired when monitoring from the S1 interface that a correspondence between an IP address and bearer of the UE is contained in the signalling and traffic data related to the UE.

Figure 4:
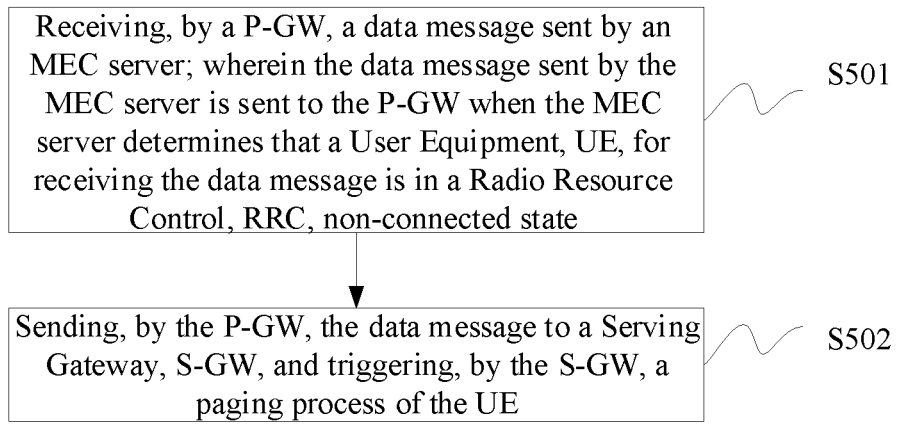
FIG. 4 is a flow schematic diagram of another data transmission method provided by an embodiment of the invention.

At the network side, referring to FIG. 4, a data transmission method provided by an embodiment of the invention includes followings.

S501: receiving, by a P-GW, a data message sent by an MEC server; wherein the data message sent by the MEC server is sent to the P-GW when the MEC server determines that a User Equipment, UE, for receiving the data message is in a Radio Resource Control, RRC, non-connected state.

S502: sending, by the P-GW, the data message to a Serving Gateway, S-GW, and triggering, by the S-GW, a paging process of the UE.

Optionally, the P-GW receives the data message forwarded by a Fire Wall, FW, and sent by the MEC server.

The apparatus corresponding to the above-mentioned data transmission method will be introduced below.

Figure 5:
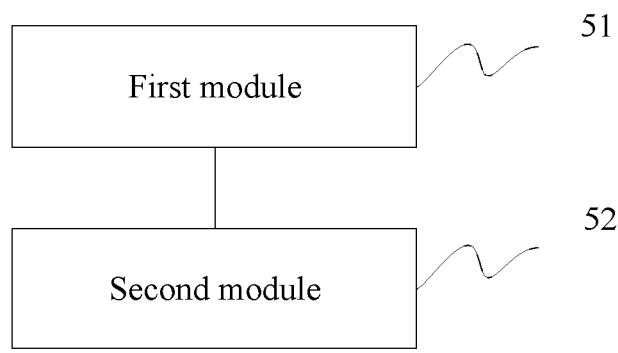
FIG. 5 is a structural schematic diagram of a data transmission apparatus provided by an embodiment of the invention.

At the MEC server side, referring to FIG. 5, a data transmission apparatus provided by an embodiment of the invention includes followings.

A first module 51 configured to, after receiving a data message sent by a local service server and when determining that a User Equipment, UE, for receiving the data message is in a Radio Resource Control, RRC, non-connected state, send the data message corresponding to the UE to a Packet Data Network-GateWay, P-GW, to trigger a paging process of the UE.

A second module 52 configured to inquire downlink bearer information for transmitting the data message to the UE in a preset duration, and send the data message according to the downlink bearer information when there is the downlink bearer information from inquiry.

Optionally, after receiving the data message sent by the local service server and when determining that the UE for receiving the data message is in the RRC non-connected state, the first module 51 is specifically configured to: after receiving the data message sent by the local service server, inquire whether the downlink bearer information for transmitting the data message to the UE exists, and determine that the UE is in the RRC non-connected state when determining that there is no downlink bearer information from inquiry.

Optionally, when sending the data message corresponding to the UE to the P-GW, the first module 51 is specifically configured to send the data message corresponding to the UE to a Fire Wall, FW, which forwards the data message to the P-GW.

Optionally, when inquiring whether the downlink bearer information for transmitting the data message to the UE exists in the preset duration, the second module 52 is specifically configured to monitor whether signalling and traffic data related to the UE exist at an S1 interface between an evolved-Node B, e-NB, and an Evolved Packet Core, EPC, in the preset duration; determine that there is downlink bearer information for transmitting the data message to the UE from inquiry when monitoring from the S1 interface that a correspondence between an IP address and bearer of the UE is contained in the signalling and traffic data related to the UE.

Figure 6:
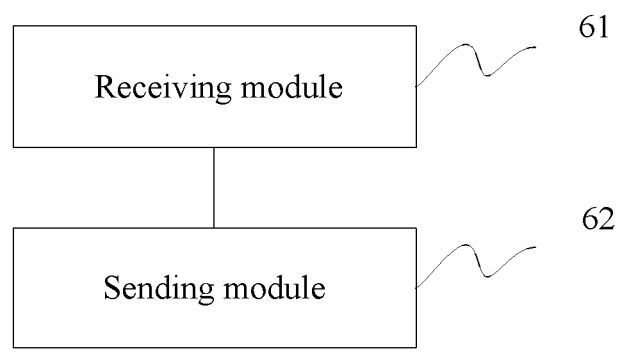
FIG. 6 is a structural schematic diagram of another data transmission apparatus provided by an embodiment of the invention.

At the network side, referring to FIG. 6, a data transmission apparatus provided by an embodiment of the invention includes followings.

A receiving module 61 configured to receive a data message sent by a Mobile Edge Compute, MEC, server; wherein the data message sent by the MEC server is sent to the apparatus when the MEC server determines that a User Equipment, UE, for receiving the data message is in a Radio Resource Control, RRC, non-connected state.

A sending module 62 configured to send the data message to a Serving Gateway, S-GW, which triggers a paging process of the UE.

Optionally, the receiving module 61 receives the data message forwarded by a Fire Wall, FW, and sent by the MEC server.

An embodiment of the invention further provides a data transmission system which includes the data transmission apparatuses at the MEC server side and the network side.

In the embodiments of the invention, all the above-mentioned function modules can be implemented by the specific hardware processor or another physical device.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A data transmission method, comprises:
after receiving a data message sent by a local service server and when determining that a User Equipment (UE) for receiving the data message is in a Radio Resource Control (RRC) non-connected state, sending, by a Mobile Edge Compute (MEC) server, the data message corresponding to the UE to a Packet Data Network-GateWay (P-GW) to trigger a paging process of the UE;
inquiring, by the MEC server, downlink bearer information for transmitting the data message to the UE in a preset duration, and sending the data message according to the downlink bearer information when there is the downlink bearer information from inquiry;
wherein the determining, by the MEC server, that the UE for receiving the data message is in the RRC non-connected state after receiving the data message sent by the local service server, comprises:
after receiving the data message sent by the local service server, inquiring, by the MEC server, whether the downlink bearer information for transmitting the data message to the UE exists, and determining, by the MEC server, that the UE is in the RRC non-connected state when determining that there is no the downlink bearer information from inquiry;
wherein the inquiring, by the MEC server, whether the downlink bearer information for transmitting the data message to the UE exists in the preset duration, comprises:
monitoring, by the MEC server, whether signaling and traffic data related to the UE exist at an S1 interface between an evolved-Node B (e-NB) and an Evolved Packet Core (EPC) in the preset duration; and
determining that there is the downlink bearer information for transmitting the data message to the UE from inquiry when monitoring from the S1 interface that a correspondence between an Internet Protocol (IP) address and bearer of the UE is contained in the signaling and traffic data related to the UE.

2. The method according to claim 1, wherein the sending, by the MEC server, the data message corresponding to the UE to the P-GW, comprises:
sending, by the MEC server, the data message corresponding to the UE to a Fire Wall (FW) and forwarding, by the FW, the data message to the P-GW.

3. A data transmission method, comprises:
receiving, by a Packet Data Network-GateWay (P-GW), a data message sent by a Mobile Edge Compute (MEC) server; wherein the data message sent by the MEC server is sent to the P-GW when the MEC server determines that a User Equipment (UE) for receiving the data message is in a Radio Resource Control (RRC) non-connected state;
sending, by the P-GW, the data message to a Serving Gateway (S-GW) and triggering, by the S-GW, a paging process of the UE;
wherein the determining, by the MEC server, that the UE for receiving the data message is in the RRC non-connected state after receiving the data message sent by a local service server, comprises:
after receiving the data message sent by the local service server, monitoring, by the MEC server, whether signaling and traffic data related to the UE exist at an S1 interface between an evolved-Node B (e-NB) and an Evolved Packet Core (EPC) in the preset duration, and determining, by the MEC server, that the UE is in the RRC non-connected state when determining that there is no downlink bearer information for transmitting the data message to the UE when monitoring from the S1 interface that a correspondence between an Internet Protocol (IP) address and bearer of the UE is not contained in the signaling and traffic data related to the UE.

4. The method according to claim 3, wherein the P-GW receives the data message sent by the MEC server and forwarded by a Fire Wall (FW).

5. A data transmission apparatus, comprising a memory configured to store a computer readable program, and a processor configured to execute the computer readable program to:
after receiving a data message sent by a local service server and when determining that a User Equipment (UE) for receiving the data message is in a Radio Resource Control (RRC) non-connected state, send the data message corresponding to the UE to a Packet Data Network-GateWay (P-GW) to trigger a paging process of the UE;
inquire downlink bearer information for transmitting the data message to the UE in a preset duration, and send the data message according to the downlink bearer information when there is the downlink bearer information from inquiry;
wherein the processor is configured to execute the computer readable program to determine that the UE for receiving the data message is in the RRC non-connected state after receiving the data message sent by the local service server by:
after receiving the data message sent by the local service server, inquiring whether the downlink bearer information for transmitting the data message to the UE exists, and determining that the UE is in the RRC non-connected state when determining that there is no the downlink bearer information from inquiry;
wherein the processor configured to execute the computer readable program to inquire whether the downlink bearer information for transmitting the data message to the UE exists in the preset duration by:
monitoring whether signaling and traffic data related to the UE exist at an S1 interface between an evolved-Node B (e-NB) and an Evolved Packet Core (EPC) in the preset duration; and
determining that there is the downlink bearer information for transmitting the data message to the UE from inquiry when monitoring from the S1 interface that a correspondence between an Internet Protocol (IP) address and bearer of the UE is contained in the signaling and traffic data related to the UE.

6. The data transmission apparatus according to claim 5, wherein the processor is configured to execute the computer readable program to send the data message corresponding to the UE to the P-GW by:
sending the data message corresponding to the UE to a Fire Wall (FW) which forwards the data message to the P-GW.

7. The data transmission apparatus according to claim 5, wherein the processor is configured to execute the computer readable program to inquire whether the downlink bearer information for transmitting the data message to the UE exists in the preset duration by:
monitoring whether signaling and traffic data related to the UE exist at an S1 interface between an evolved-Node B (e-NB) and an Evolved Packet Core (EPC) in the preset duration;
determining that there is the downlink bearer information for transmitting the data message to the UE from inquiry when monitoring from the S1 interface that a correspondence between an Internal Protocol (IP) address and bearer of the UE is contained in the signaling and traffic data related to the UE.

8. A data transmission apparatus, comprises a memory configured to store a computer readable program, and a processor configured to execute the computer readable program to:
receive a data message sent by a Mobile Edge Compute (MEC) server; wherein the data message sent by the MEC server is sent to the data transmission apparatus when the MEC server determines that a User Equipment (UE) for receiving the data message is in a Radio Resource Control (RRC) non-connected state;
send the data message to a Serving Gateway (S-GW) which triggers a paging process of the UE;
wherein the determining, by the MEC server, that the UE for receiving the data message is in the RRC non-connected state after receiving the data message sent by a local service server, comprises:
after receiving the data message sent by the local service server, monitoring, by the MEC server, whether signaling and traffic data related to the UE exist at an S1 interface between an evolved-Node B (e-NB) and an Evolved Packet Core (EPC) in the preset duration, and determining, by the MEC server, that the UE is in the RRC non-connected state when determining that there is no downlink bearer information for transmitting the data message to the UE when monitoring from the S1 interface that a correspondence between an Internet Protocol (IP) address and bearer of the UE is not contained in the signaling and traffic data related to the UE.

9. The data transmission apparatus according to claim 8, wherein the processor is configured to execute the computer readable program to receive the data message forwarded by a Fire Wall (FW); the data message is sent by the MEC server.

* * * * *